United States Patent
Uratani et al.

(10) Patent No.: US 10,706,238 B2
(45) Date of Patent: Jul. 7, 2020

(54) LANGUAGE SETTING APPARATUS, LANGUAGE SETTING METHOD, AND DISPLAY APPARATUS

(71) Applicant: Sharp Kabushiki Kaisha, Sakai, Osaka (JP)

(72) Inventors: Osamu Uratani, Sakai (JP); Shoji Yamamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/271,668

(22) Filed: Feb. 8, 2019

(65) Prior Publication Data
US 2019/0251177 A1 Aug. 15, 2019

(30) Foreign Application Priority Data
Feb. 9, 2018 (JP) .................................. 2018-022213

(51) Int. Cl.
*G06F 40/58* (2020.01)
*G09G 5/00* (2006.01)
*G06F 3/0482* (2013.01)

(52) U.S. Cl.
CPC ............ *G06F 40/58* (2020.01); *G06F 3/0482* (2013.01); *G09G 5/003* (2013.01); *G09G 2354/00* (2013.01)

(58) Field of Classification Search
CPC .... G06F 3/0482; G06F 3/0481; G06F 17/289; G06F 9/454; G06F 40/51; G06F 40/53; G06F 40/56; G06F 40/58; G09G 5/003; G09G 2354/00
See application file for complete search history.

(56) References Cited

U.S. PATENT DOCUMENTS

2015/0186357 A1* 7/2015 Oldham .................. G06F 9/454
704/8

FOREIGN PATENT DOCUMENTS

JP 2003-046892 A 2/2003

OTHER PUBLICATIONS

Articulate.com, "How to add keyboard input language in Windows", (Oct. 5, 2016), <URL https://articulate.com/support/article/how-to-add-a-keyboard-input-language-in-windows/>, p. 1-3. (Year: 2016).*
MicroStrategy, "MicroStrategy Supplemental Reference for System Administration", (Dec. 2016), Ver. 10.5, p. 1-969. (Year: 2016).*

* cited by examiner

*Primary Examiner* — Ajay M Bhatia
*Assistant Examiner* — Mong-Shune Chung
(74) *Attorney, Agent, or Firm* — ScienBiziP, P.C.

(57) ABSTRACT

A language setting apparatus includes a first control unit, a second control unit, a reception unit, a storage unit, and a first determination unit. The storage unit stores first correspondence information in which each of a plurality of first candidate languages corresponds to an associated one of a plurality of second candidate languages. The first determination unit determines a display language of the second control unit based on the first correspondence information and a reception language representing a language which is received and which is included in the plurality of first candidate languages. The second control unit sets the display language of the second control unit determined as the display language of the second control unit.

8 Claims, 16 Drawing Sheets

FIG. 2

| 32a | | 32b | 32c |
|---|---|---|---|
| Japanese | ⇒ | JAPANESE | 41 |
| Deutsch (Deutschland) | ⇒ | DEUTSCH | 41 |
| Deutsch (Liechtenstein) | ⇒ | DEUTSCH | 42 |
| Deutsch (Österreich) | ⇒ | DEUTSCH | |
| Deutsch (Schweiz) | ⇒ | DEUTSCH | |
| English (Australia) | ⇒ | ENGLISH | 42 |
| English (Canada) | ⇒ | ENGLISH | |
| English (India) | ⇒ | ENGLISH | |
| English (New Zealand) | ⇒ | ENGLISH | |
| English (Singapore) | ⇒ | ENGLISH | |
| English (United Kingdom) | ⇒ | ENGLISH | |
| English (United States) | ⇒ | ENGLISH | 41 |
| English (España) | ⇒ | ENGLISH | |
| Español (España) | ⇒ | ESPAGÑOL | 41 |
| Español (Estados Unidos) | ⇒ | ESPAGÑOL | |
| Français (Belgique) | ⇒ | FRANÇAIS | 42 |
| Français (Canada) | ⇒ | FRANÇAIS | |
| Français (France) | ⇒ | FRANÇAIS | 41 |
| Français (Suisse) | ⇒ | FRANÇAIS | |
| Italiano (Italia) | ⇒ | ITALIANO | 41 |
| Italiano (Svizzera) | ⇒ | ITALIANO | 42 |
| Русский | ⇒ | Русский | 41 |
| Chinese (Hong Kong) | ⇒ | ENGLISH | 43 |
| Chinese (Traditional) | ⇒ | ENGLISH | 43 |
| Chinese (Simplified) | ⇒ | CHINESE | 41 |

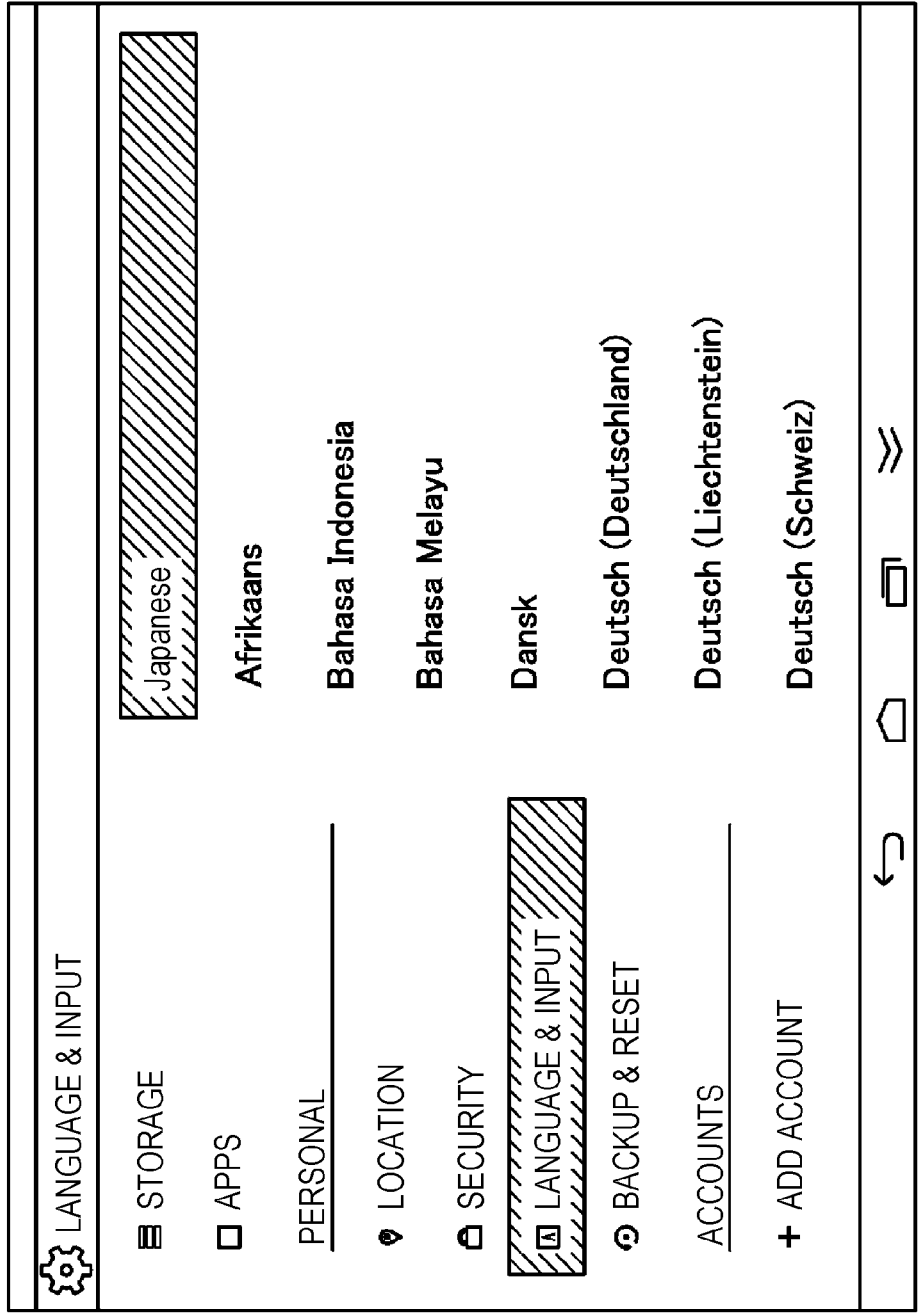

| 32b | | 32a | 32d |
|---|---|---|---|
| JAPANESE | ⇒ | Japanese | ←44 |
| DEUTSCH | ⇒ | Deutsch (Deutschland) | ←44 |
| | | Deutsch (Liechtenstein) | |
| | | Deutsch (Österreich) | |
| | | Deutsch (Schweiz) | |
| | | English (Australia) | |
| | | English (Canada) | |
| | | English (India) | |
| | | English (New Zealand) | |
| | | English (Singapore) | |
| | | English (United Kingdom) | |
| ENGLISH | ⇒ | English (United States) | ←44 |
| | | English (España) | |
| ESPAÑOL | ⇒ | Español (España) | ←44 |
| | | Español (Estados Unidos) | |
| | | Français (Belgique) | |
| | | Français (Canada) | |
| FRANÇAIS | ⇒ | Français (France) | ←44 |
| | | Français (Suisse) | |
| ITALIANO | ⇒ | Italiano (Italia) | ←44 |
| | | Italiano (Svizzera) | |
| РУССКИЙ | ⇒ | Русский | ←44 |
| | | Chinese (Hong Kong) | |
| | | Chinese (Traditional) | |
| CHINESE | ⇒ | Chinese (Simplified) | ←44 |

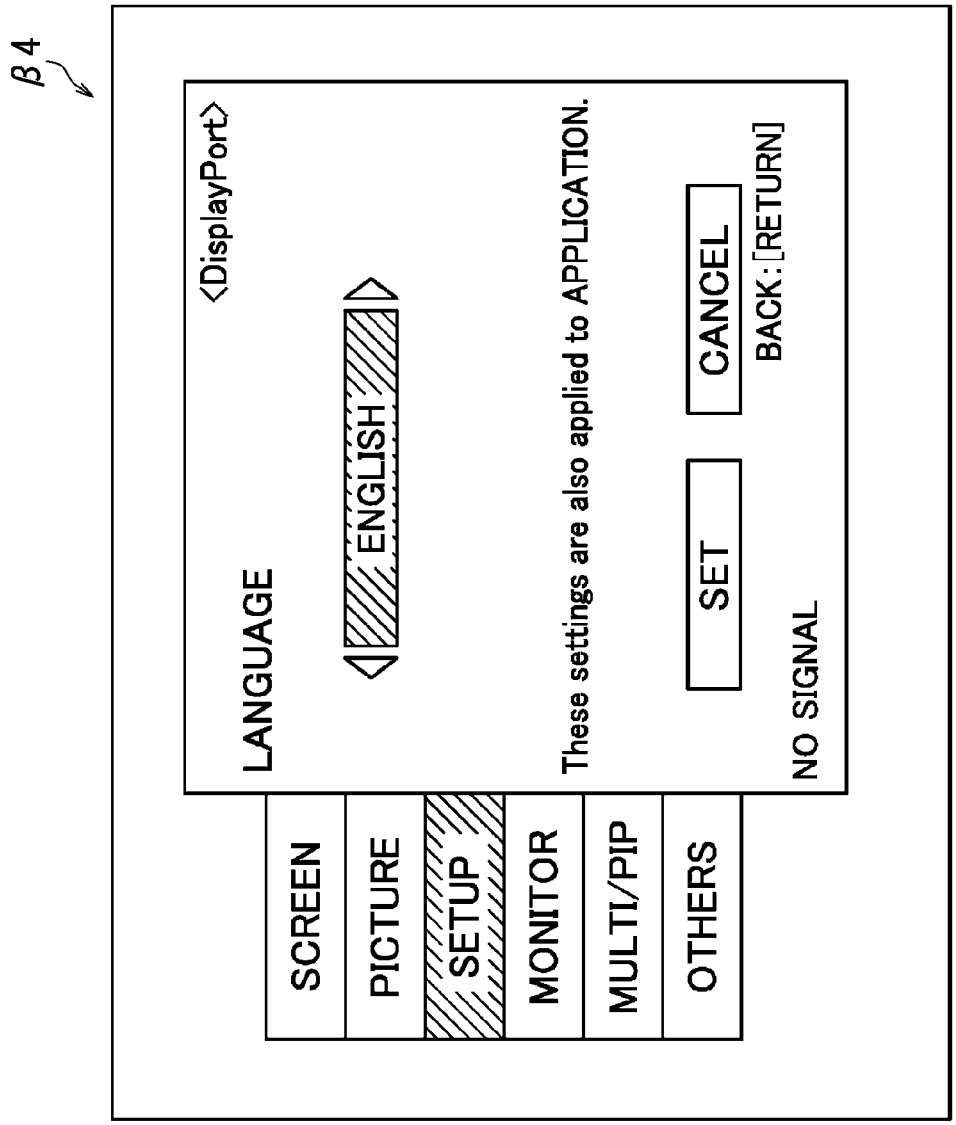

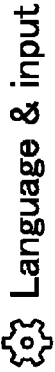

LANGUAGE SETTING APPARATUS, LANGUAGE SETTING METHOD, AND DISPLAY APPARATUS

BACKGROUND

1. Field

The present disclosure relates to a language setting apparatus and a display apparatus.

2. Description of the Related Art

Japanese Unexamined Patent Application Publication No. 2003-46892 describes an on-screen display device which displays a display language set menu when an initial power source is applied, and the on-screen display device detects a change of a power source voltage or a power source frequency. When the power source voltage or the power source frequency is changed, the on-screen display device determines that a service environment is changed, and the on-screen display device displays the display language set menu. Accordingly, a user can selectively set the display language of on-screen character while viewing the display language set menu when the initial power source is applied or the service environment is changed.

When, however, one product includes a plurality of platforms and it is possible to set a display language for each platform, a user has to perform an action of setting the display language several times, which is troublesome.

It is desirable to provide a language setting apparatus which enables a plurality of display languages to be set and a display apparatus.

SUMMARY

According to a first aspect of the present disclosure, a language setting apparatus includes a first control unit, a second control unit, a reception unit, a storage unit, and a determination unit. The first control unit sets a display language from a plurality of first candidate languages. The second control unit sets a display language from a plurality of second candidate languages. The reception unit receives a selection of the display language by the first control unit from the plurality of first candidate languages. The storage unit stores first correspondence information in which each of the plurality of first candidate languages corresponds to an associated one of the plurality of second candidate languages. The determination unit determines the display language of the second control unit based on the first correspondence information and a reception language representing a language which is received by the reception unit and which is included in the plurality of first candidate languages. The second control unit sets the display language of the second control unit determined by the determination unit as the display language of the second control unit.

According to a second aspect of the present disclosure, a display apparatus includes the language setting apparatus and a display section which displays an image.

BRIEF DESCRIPTION OF THE DRAWINGS

FIG. 2 is a view illustrating first correspondence information;

FIG. 4A is a view illustrating a first example of a setting screen for setting a display language of the first control unit.

FIG. 5A is a view illustrating a second example of a setting screen for setting a display language of the first control unit.

FIG. 7 is a view illustrating second correspondence information;

FIG. 10A is a view illustrating a fourth example of a setting screen for setting a display language of the second control unit, and FIG. 10B is a view illustrating a fourth example of a setting screen for setting a display language of the first control unit;

DESCRIPTION OF THE EMBODIMENTS

Figure 1:
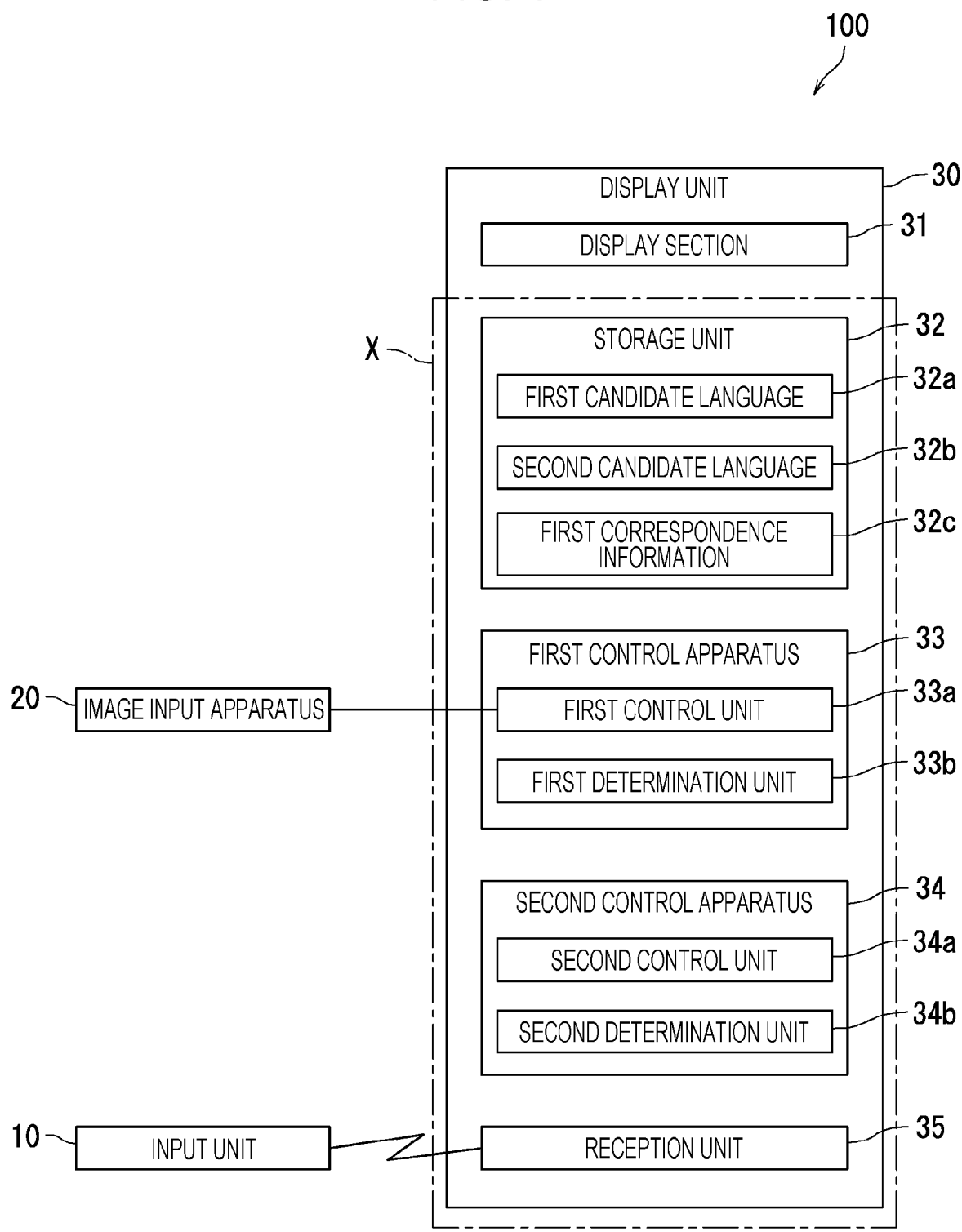
FIG. 1 is a block diagram illustrating a display apparatus according to a first embodiment of the disclosure.

Embodiments of the present disclosure will be described with reference to the drawings. In the drawings, like reference characters are used to designate identical or equivalent elements, and explanation thereof is not repeated.

First Embodiment

With reference to FIGS. 1 and 2, a display apparatus 100 according to a first embodiment of the present disclosure will be described. FIG. 1 is a block diagram illustrating the display apparatus 100 according to the first embodiment of the disclosure.

As illustrated in FIG. 1, the display apparatus 100 functions as, for example, a digital signage apparatus. The display apparatus 100 includes an input unit 10, an image input apparatus 20, a display unit 30, and a language setting apparatus X.

The input unit 10 receives an instruction to the display apparatus 100. The input unit 10 is, for example, a remote controller having a function of performing infrared communication with the display unit 30. The input unit 10 includes, for example, an operation button, and/or, an operation unit such as a touch panel. A user operates the operation unit to input the instruction to the display apparatus 100. Note that the input unit 10 may be disposed in a housing of the display unit 30 and may be wire-connected to the display unit 30. Alternatively, the input unit 10 may receive a voice instruction to the display apparatus 100.

The image input apparatus 20 acquires image data to be displayed by the display apparatus 100 and inputs the image data to the display unit 30. The image input apparatus 20 receives, for example, image data distributed by digital signage or image data of television broadcasting and inputs the image data to the display unit 30. Alternatively, the image input apparatus 20 reads, for example, image data recorded in a recording apparatus, such as a HDD and inputs the image data to the display unit 30. Alternatively, the image input apparatus 20 acquires, for example, image data captured by an image capturing apparatus such as a camera and inputs the image data to the display unit 30.

The display unit 30 includes a display section 31 and the language setting apparatus X.

The display section 31 is, for example, a liquid crystal display. Note that the display apparatus 100 may be an electro-luminescence (EL) display or a plasma display (PDP).

The language setting apparatus X includes a storage unit 32, a first control apparatus 33, a second control apparatus 34, and a reception unit 35.

The storage unit 32 includes a primary memory (for example, semiconductor memory) such as read only memory (ROM) and random access memory (RAM) and may further include a secondary memory (for example, a hard disk drive). The storage unit 32 stores various types of computer programs to be executed by the first control apparatus 33 and the second control apparatus 34.

The storage unit 32 stores a plurality of first candidate languages 32a, a plurality of second candidate languages 32b, and first correspondence information 32c.

Each of the first control apparatus 33 and the second control apparatus 34 includes a processor such as a central processing unit (CPU) and a micro processing unit (MPU). The first control apparatus 33 and the second control apparatus 34 execute the computer programs stored in the storage unit 32, thereby controlling components in the display unit 30.

The first control apparatus 33 includes a first control unit 33a and a first determination unit 33b. Specifically, the processor of the first control apparatus 33 executes the computer program stored in the storage unit 32 to function as the first control unit 33a and the first determination unit 33b.

The second control apparatus 34 includes a second control unit 34a and a second determination unit 34b. Specifically, the processor of the second control apparatus 34 executes the computer program stored in the storage unit 32 to function as the second control unit 34a and the second determination unit 34b.

In the first embodiment, the first control apparatus 33 and the second control apparatus 34 are accommodated in a single housing. An installation configuration of the first control apparatus 33 and the second control apparatus 34 will be specifically described below.

The first control apparatus 33 is disposed on a first substrate. The second control apparatus 34 is disposed on a second substrate. The first substrate and the second substrate are connected to each other by a connector. The first substrate and the second substrate are accommodated in a single housing. Note that the first control apparatus 33 and the second control apparatus 34 may be disposed on a single substrate. The display section 31 may also be disposed in the housing. Alternatively, the housing and the display section 31 may be separated.

The first control unit 33a and the second control unit 34a are included one product. The one product refers to, for example, a product put on a market as an item of goods or a product to be put on a market as an item of goods. In the first embodiment, the one product is the display apparatus 100. The first control unit 33a and the second control unit 34a run on respective platforms different from each other. Examples of the platforms include an operating system (OS) such as Android (registered trademark), Windows (registered trademark), and Linux (registered trademark) or dedicated firmware. The first control unit 33a and the second control unit 34a are connected to each other. The first control unit 33a and the second control unit 34a are capable of performing transmission and reception of information between the first control unit 33a and the second control unit 34a.

The first control unit 33a performs control of displaying, for example, contents. The first control apparatus 33 acquires image data from the image input apparatus 20 and displays the image data in the display section 31. The first control apparatus 33 executes various types of application software. Examples of the application software include software for displaying images, software for playing back video, and software for updating programs. A user gives an instruction for displaying the contents to the first control unit 33a via, for example, the input unit 10.

FIG. 2 is a view illustrating the plurality of first candidate languages 32a and the plurality of second candidate languages 32b.

As illustrated in FIGS. 1 and 2, the first control unit 33a sets a display language of the first control unit 33a from the plurality of first candidate languages 32a. The plurality of first candidate languages 32a represent languages of major countries in which the first control unit 33a is used. The plurality of first candidate languages 32a are prescribed. The display language of the first control unit 33a represents an on-screen display (OSD) language of the platform of the first control unit 33a. The input unit 10 allows a user to give an instruction about the display language of the first control unit 33a to the first control unit 33a. When the user gives the instruction about the display language of the first control unit 33a via the input unit 10, the first control unit 33a sets the display language instructed by the user as the display language of the first control unit 33a. As a result, an image including the display language set by the first control unit 33a is displayed in a screen in which the display section 31 displays the contents.

The second control unit 34a performs control of setting of, for example, the display section 31. The second control unit 34a controls a scaler to adjust the quality of the image to be displayed in the display section 31. The scaler refers to a circuit which converts pixels of the image input from the image input apparatus 20 to be compatible with pixels of the display section 31. A user gives an instruction for setting of the display unit 31 via, for example, the input unit 10 to adjust the quality of the image to be displayed in the display section 31.

The second control unit 34a sets a display language of the second control unit 34a from the plurality of second candidate languages 32b. The plurality of second candidate language 32b represent languages of major countries in which the second control unit 34a is used. The plurality of second candidate languages 32b are prescribed. The display language of the second control unit 34a represents an OSD language of the platform of the second control unit 34a. The input unit 10 allows a user to give an instruction about the display language of the second control unit 34a to the second control unit 34a. When the user gives the instruction about the display language of the second control unit 34a via the input unit 10, the second control unit 34a sets the display language instructed by the user as the display language of the second control unit 34a. As a result, an image including the display language set by the second control unit 34a is displayed in a setting screen of the display section 31.

The first determination unit 33b or the second determination unit 34b determines the display language of the second control unit 34a. In the first embodiment, the first determination unit 33b determines the display language of the second control unit 34a. A procedure according to which the first determination unit 33b determines the display language of the second control unit 34a will be described later. The first determination unit 33b and the second determination unit 34b are examples of a determination unit of the disclosure.

The reception unit 35 is connected to be able to perform wired or wireless communication with the input unit 10. In the present embodiment, the reception unit 35 is a device which receives infrared light output from the input unit 10. The reception unit 35 is an example of a reception unit of the present disclosure. Note that the reception unit 35 may be a device having the function of the input unit 10 such as, for example, a touch panel.

When the input unit 10 receives an instruction to the display apparatus 100, each of the first control unit 33a and the second control unit 34a acquires the instruction to the display apparatus 100 via the reception unit 35.

Next, with reference to FIG. 2, the first correspondence information 32c will be described. FIG. 2 further shows the first correspondence information 32c.

As illustrated in FIG. 2, the first correspondence information 32c represents information in which each of the first candidate languages 32a corresponds to an associated one of the plurality of second candidate languages 32b.

In the first embodiment, the plurality of first candidate languages 32a may be more than the plurality of second candidate languages 32b.

The first correspondence information 32c includes pieces of first information 41, pieces of second information 42, and pieces of third information 43.

Each of the pieces of first information 41 represents information in which a first candidate language 32a corresponds to a second candidate language 32b having a concept equivalent to the concept of the first candidate language 32a. For example, in the first information 41, "Japanese" as the first candidate language 32a corresponds to "JAPANESE" as the second candidate language 32b.

Each of the pieces of second information 42 represents information in which a first candidate language 32a corresponds to a second candidate language 32b having a concept superior to the concept of the first candidate language 32a. For example, in the second information 42, "English (Australia)" as the first candidate language 32a corresponds to "ENGLISH" as the second candidate language 32b. The language having a superior concept represents, for example, a standard language with respect to a dialect.

Each of the pieces of third information 43 represents information in which a language which is included in the plurality of first candidate languages 32a and which is not included in the plurality of second candidate languages 32b corresponds to "ENGLISH". For example, in the third information 43, "Chinese (Hong Kong)" as the first candidate language 32a corresponds to "ENGLISH" as the second candidate language 32b.

Figure 3:
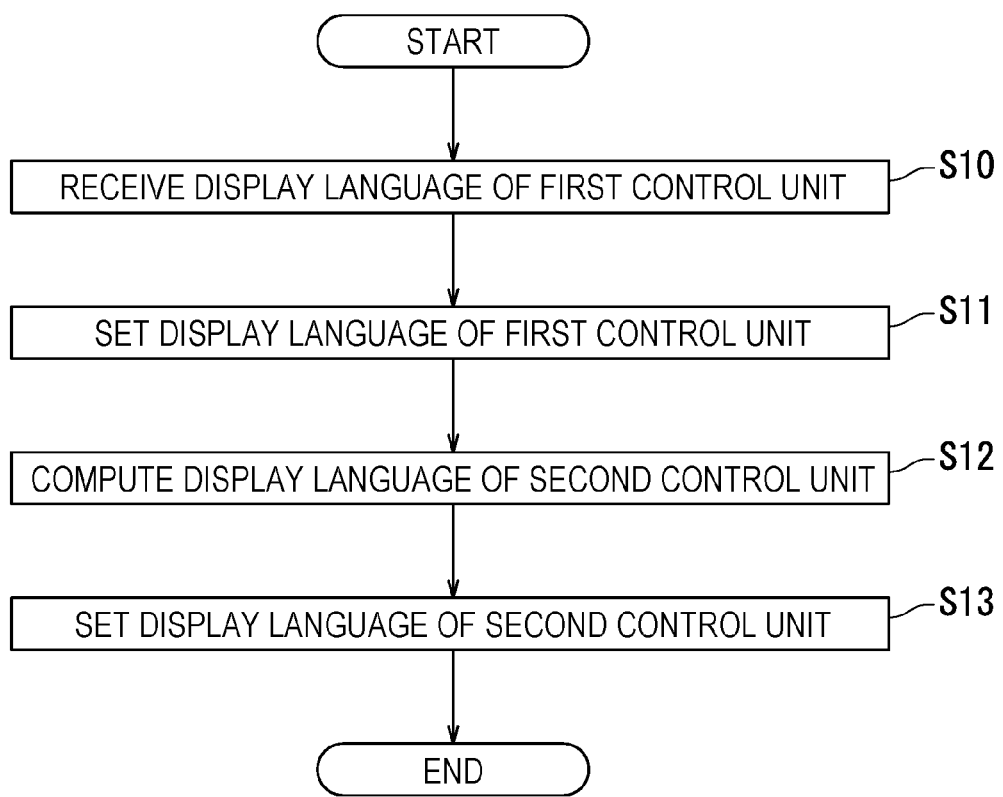
FIG. 3 is a flow diagram illustrating a first operation performed by a first control apparatus and a second control apparatus.

Next, with reference to FIG. 3, a first operation performed by the first control apparatus 33 and the second control apparatus 34 will be described. FIG. 3 is a flow diagram illustrating the first operation performed by the first control apparatus 33 and the second control apparatus 34.

As illustrated in FIG. 3, in step S10, the reception unit 35 receives a selection of the display language of the first control unit 33a from the plurality of first candidate languages 32a. In detail, a user first operates the input unit 10 to cause the display section 31 to display a setting screen for setting the display language of the first control unit 33a. In the setting screen, for example, an image showing the plurality of first candidate languages 32a is displayed. Then, the user operates the input unit 10 to select, from the plurality of first candidate languages 32a in the setting screen, a desired first candidate language 32a. As a result, the reception unit 35 receives information representing the language selected from the plurality of first candidate languages 32a via the input unit 10.

The language of the plurality of first candidate languages 32a which is received by the reception unit 35 is hereinafter referred to as a first reception language.

In step S11, the first control unit 33a sets the first reception language as the display language of the first control unit 33a.

Note that one of the plurality of first candidate language 32a may be displayed in the setting screen, and the first candidate language 32a displayed in the setting screen may be set as the display language of the first control unit 33a. In this case, when the first candidate language 32a displayed in the setting screen is changed via the input unit 10, the first candidate language 32a after the changing is set as the display language of the first control unit 33a.

In step S12, the first determination unit 33b determines the display language of the second control unit 34a based on the first correspondence information 32c and the first reception language. The first determination unit 33b determines that a second candidate language 32b which is included in the first correspondence information 32c and which corresponds to the first reception language is the display language of the second control unit 34a. For example, when the first reception language is "Japanese", the first determination unit 33b determines "JAPANESE" as the display language of the second control unit 34a. Alternatively, when the first reception language is "English (Australia)", the first determination unit 33b determines "ENGLISH" as the display language of the second control unit 34a. Alternatively, when the first reception language is "Chinese (Hong Kong)", the first determination unit 33b determines "ENGLISH" as the display language of the second control unit 34a.

In step S13, the second control unit 34a sets the display language of the second control unit 34a determined by the first determination unit 33b as the display language of the second control unit 34a. Thus, the process is terminated.

As described with reference to FIGS. 1 to 3 above, the second control unit 34a sets the display language of the second control unit 34a determined by the first determination unit 33b as the display language of the second control unit 34a. Thus, when a user sets the display language of the first control unit 33a, the display language of the second control unit 34a is set without the user having to perform an operation. Thus, it is possible to easily set the plurality of display languages.

Moreover, the first determination unit 33b determines the display language of the second control unit 34a based on the first correspondence information 32c. Thus, it is possible to set a desired display language of a user or a display language similar to the desired display language of the user as the display language of the second control unit 34a.

Moreover, in the first correspondence information 32c, the plurality of first candidate languages 32a may be more than the plurality of second candidate languages 32b. Thus, when the first correspondence information 32c is created, it is possible to select a language to which the second candidate language 32b corresponds from a large number of first candidate languages 32a. This enables the second candidate language 32b to accurately correspond to the first candidate language 32a.

Next, specific examples of processes performed in step S10 to step S13 will be described with reference to FIGS. 4A to 5B.

Figure 4B:
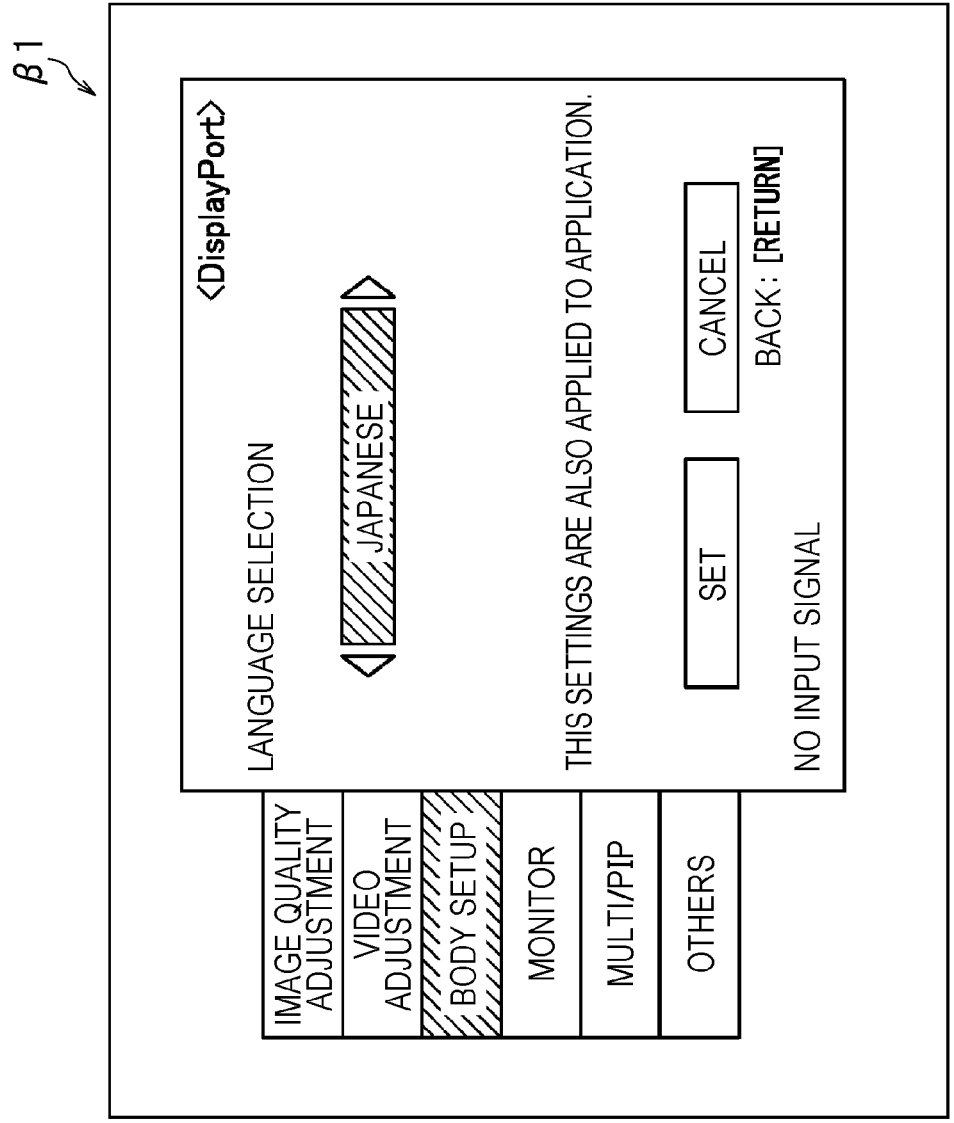
FIG. 4B is a view illustrating a first example of a setting screen for setting a display language of the second control unit.
Figure 5A:
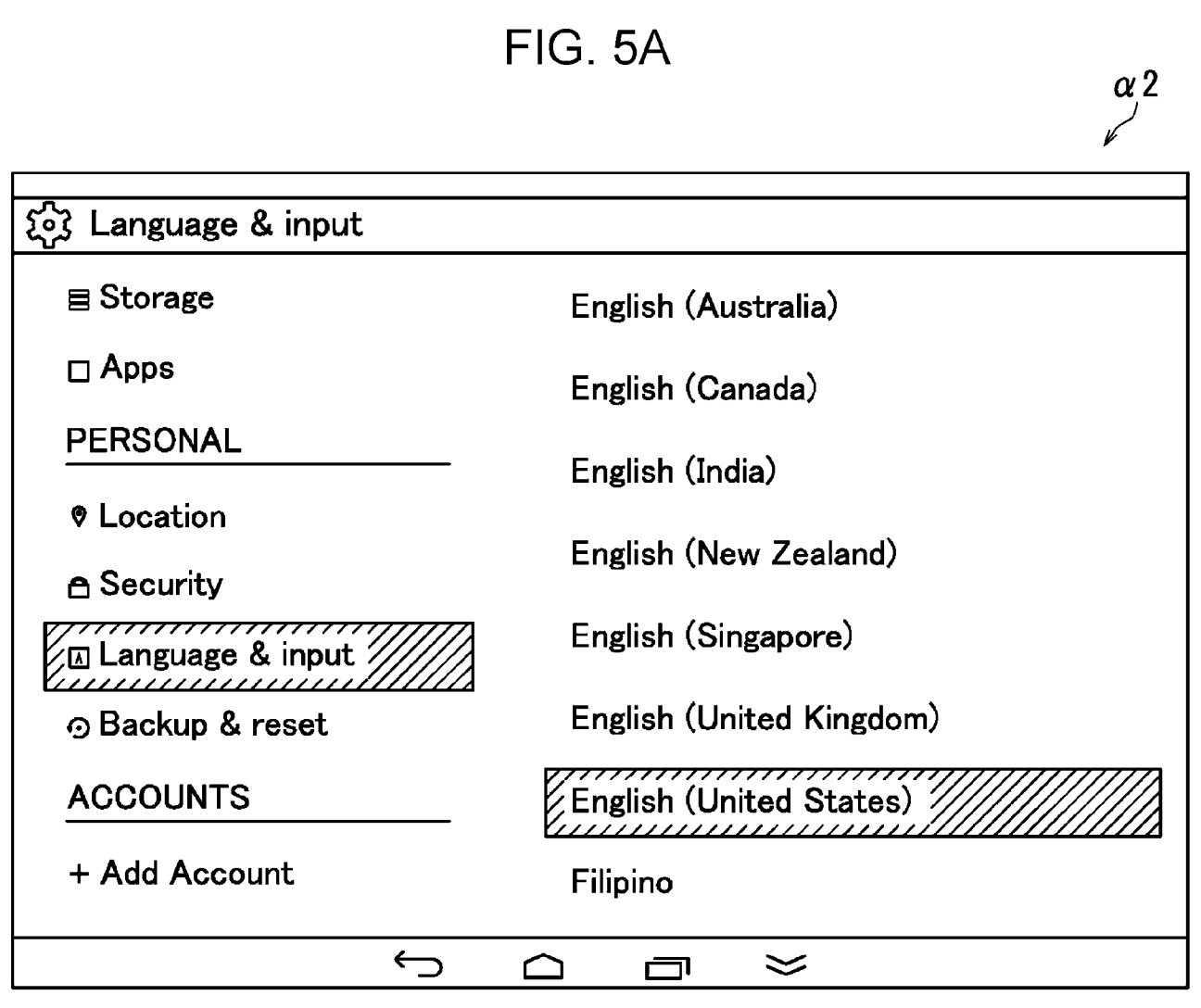
Figure 5B:
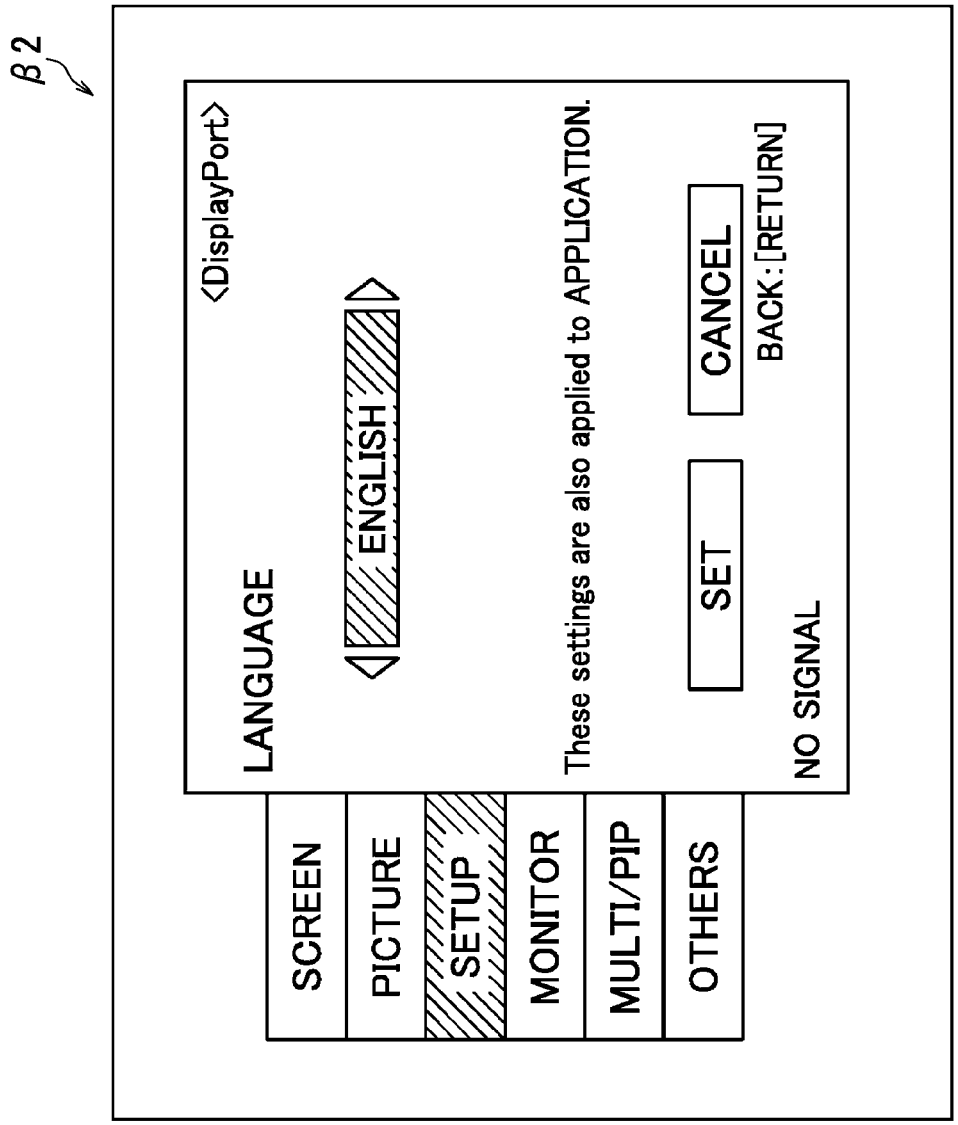
FIG. 5B is a view illustrating a second example of a setting screen for setting a display language of the second control unit.

FIG. 4A is a view illustrating a first example α1 of the setting screen for setting the display language of the first control unit 33a. FIG. 4B is a view illustrating a first example β1 of the setting screen for setting the display language of the second control unit 34a. FIG. 5A is a view illustrating a second example α2 of the setting screen for setting the display language of the first control unit 33a. FIG. 5B is a view illustrating a second example β2 of the setting screen for setting the display language of the second control unit 34a.

As illustrated in FIGS. 4A and 4B, the display language of the first control unit 33a and the display language of the second control unit 34a are at first set to "Japanese" and "JAPANESE" respectively.

As illustrated in FIGS. 4A and 5A, in a state shown as the first example α1 of the setting screen, a user then operates the input unit 10 to select "English (United States)". As a result, as illustrated in the first example α1 and the second example α2 of the setting screen, the display language of the first control unit 33a is changed from "Japanese" to "English (United States)".

When the display language of the first control unit 33a is changed from "Japanese" to "English (United States)", the first determination unit 33b determines the display language of the second control unit 34a as "ENGLISH" based on the first correspondence information 32c.

As illustrated in FIGS. 4B and 5B, when the first determination unit 33b determines the display language of the second control unit 34a as "ENGLISH", the second control unit 34a sets "ENGLISH" as the display language of the second control unit 34a. As a result, as illustrated in the first example β1 and the second example β2 of the setting screen, the display language of the second control unit 34a is changed from "JAPANESE" to "ENGLISH".

Second Embodiment

Figure 6:
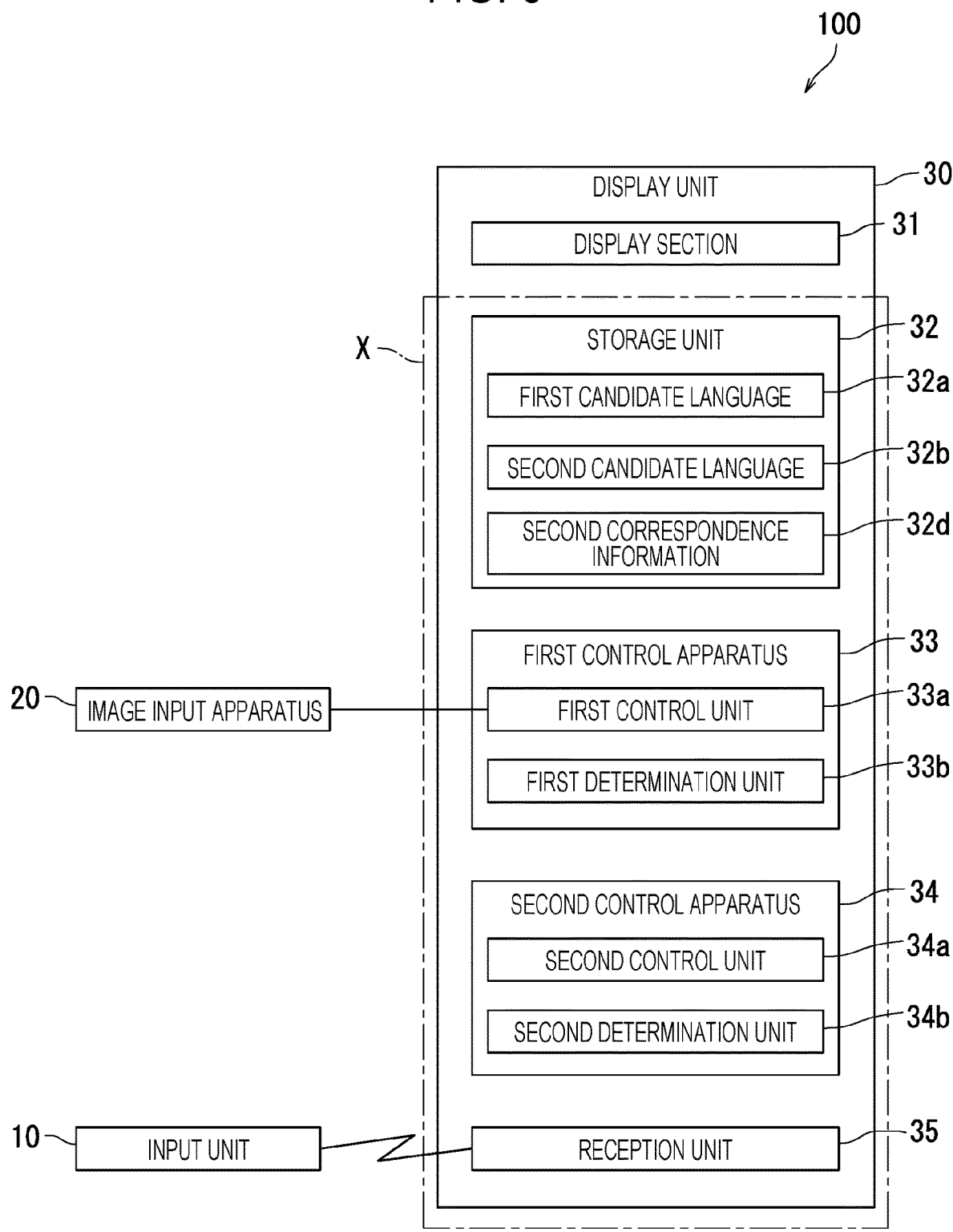
FIG. 6 is a block diagram illustrating a display apparatus according to a second embodiment of the disclosure.

With reference to FIG. 6, a display apparatus 100 according to a second embodiment of the present disclosure will be described. FIG. 6 is a block diagram illustrating the display apparatus 100 according to the second embodiment of the disclosure.

The second embodiment is different from the first embodiment in that when a display language of a second control unit 34a is set, a display language of a first control unit 33a is determined. Differences from the first embodiment will be mainly described below.

A storage unit 32 stores second correspondence information 32d. The second correspondence information 32d will be described later.

A first determination unit 33b or a second determination unit 34b determines the display language of the first control unit 33a. In the second embodiment, the second determination unit 34b determines the display language of the first control unit 33a. A procedure according to which the second determination unit 34b determines the display language of the first control unit 33a will be described later.

Next, with reference to FIG. 7, the second correspondence information 32d will be described. FIG. 7 is a view illustrating the second correspondence information 32d.

As illustrated in FIG. 7, the second correspondence information 32d represents information in which each of second candidate languages 32b corresponds to an associated one of a plurality of first candidate languages 32a.

The second correspondence information 32d includes pieces of fourth information 44. Each of the pieces of fourth information 44 represents information in which a second candidate language 32b corresponds to a first candidate language 32a having a concept equivalent to the concept of the second candidate language 32b. For example, in the fourth information 44, "Japanese" as the first candidate language 32a corresponds to "JAPANESE" as the second candidate language 32b.

Figure 8:
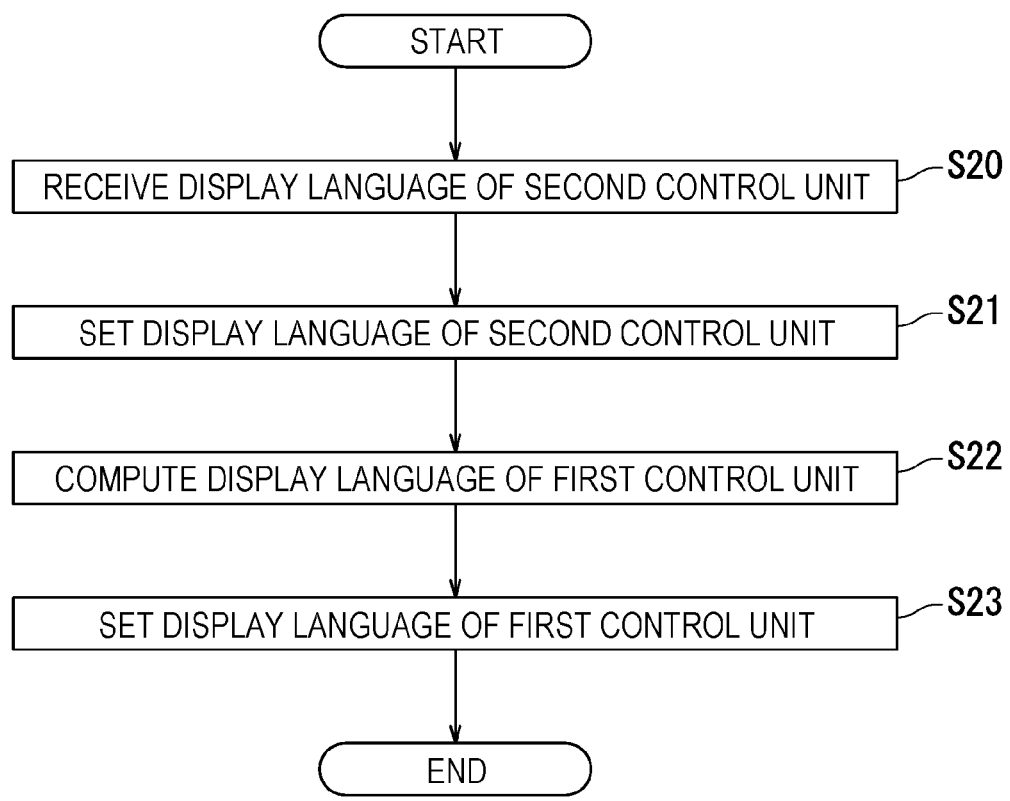
FIG. 8 is a flow diagram illustrating a second operation performed by a first control apparatus and a second control apparatus.

Next, with reference to FIG. 8, a second operation performed by a first control apparatus 33 and a second control apparatus 34 will be described. FIG. 8 is a flow diagram illustrating the second operation performed by the first control apparatus 33 and the second control apparatus 34.

As illustrated in FIG. 8, in step S20, a reception unit 35 receives a selection of the display language of the second control unit 34a from the plurality of second candidate languages 32b. That is, the reception unit 35 receives information representing the language selected from the plurality of second candidate languages 32b via an input unit 10.

The language of second candidate languages 32b which is received by the reception unit 35 is hereinafter referred to as a second reception language.

In step S21, the second control unit 34a sets the second reception language as the display language of the second control unit 34a.

In step S22, the second determination unit 34b determines the display language of the first control unit 33a based on the second correspondence information 32d and the second reception language. The second determination unit 34b determines that a first candidate language 32a which is included in the second correspondence information 32d and which corresponds to the second reception language is the display language of the first control unit 33a. For example, when the second reception language is "ENGLISH", the second determination unit 34b determines "English (United States)" as the display language of the first control unit 33a.

In step S23, the first control unit 33a sets the display language of the first control unit 33a determined by the second determination unit 34b as the display language of the first control unit 33a. Thus, the process is terminated.

As described above with reference to FIGS. 6 to 8, the first control unit 33a sets the display language of the first control unit 33a determined by the second determination unit 34b as the display language of the first control unit 33a. Thus, when a user sets the display language of the second control unit 34a, the display language of the first control unit 33a is set without the user having to perform an operation. Thus, it is possible to easily set the plurality of display languages.

Next, specific examples of processes performed in step S20 to step S23 will be described with reference to FIGS. 9A to 10B.

Figure 9A:
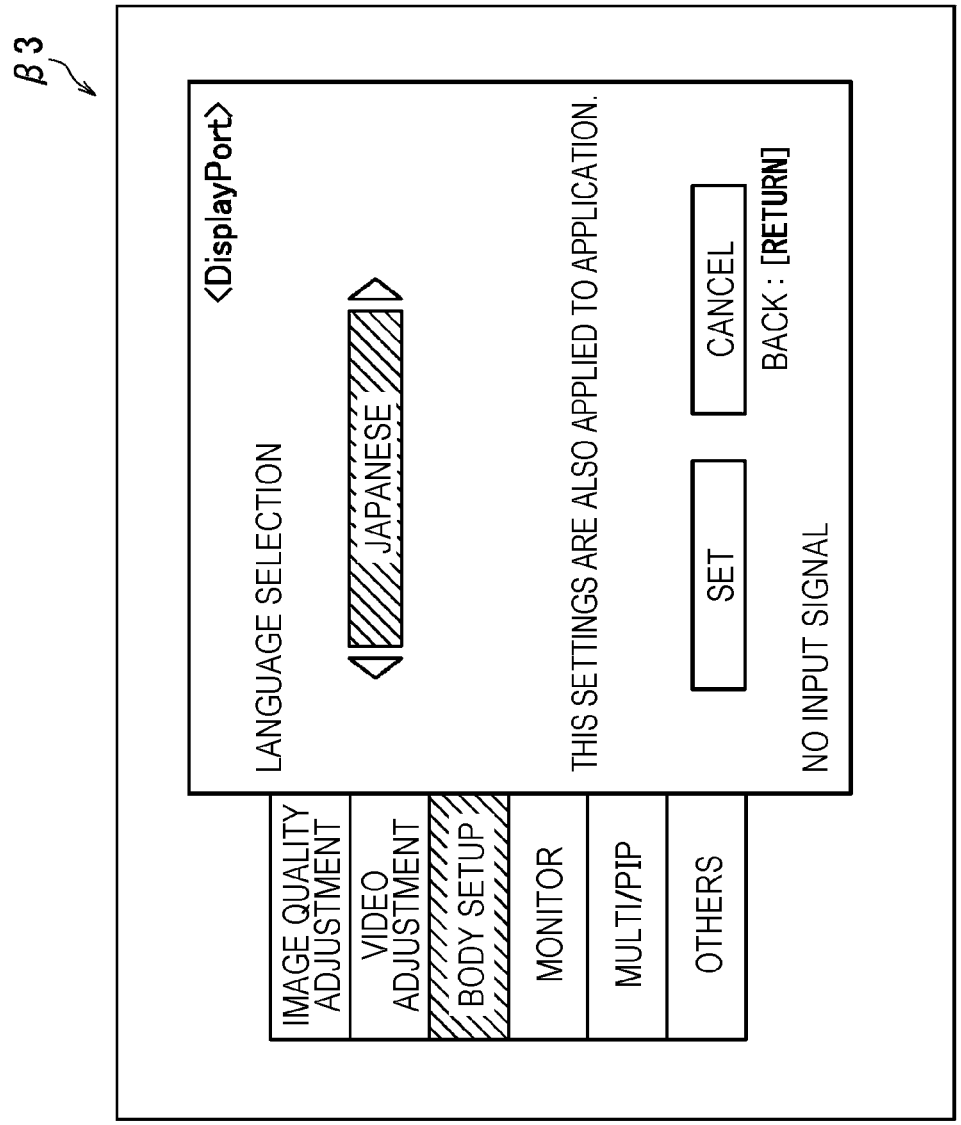
FIG. 9A is a view illustrating a third example of a setting screen for setting a display language of the second control unit.
Figure 9B:
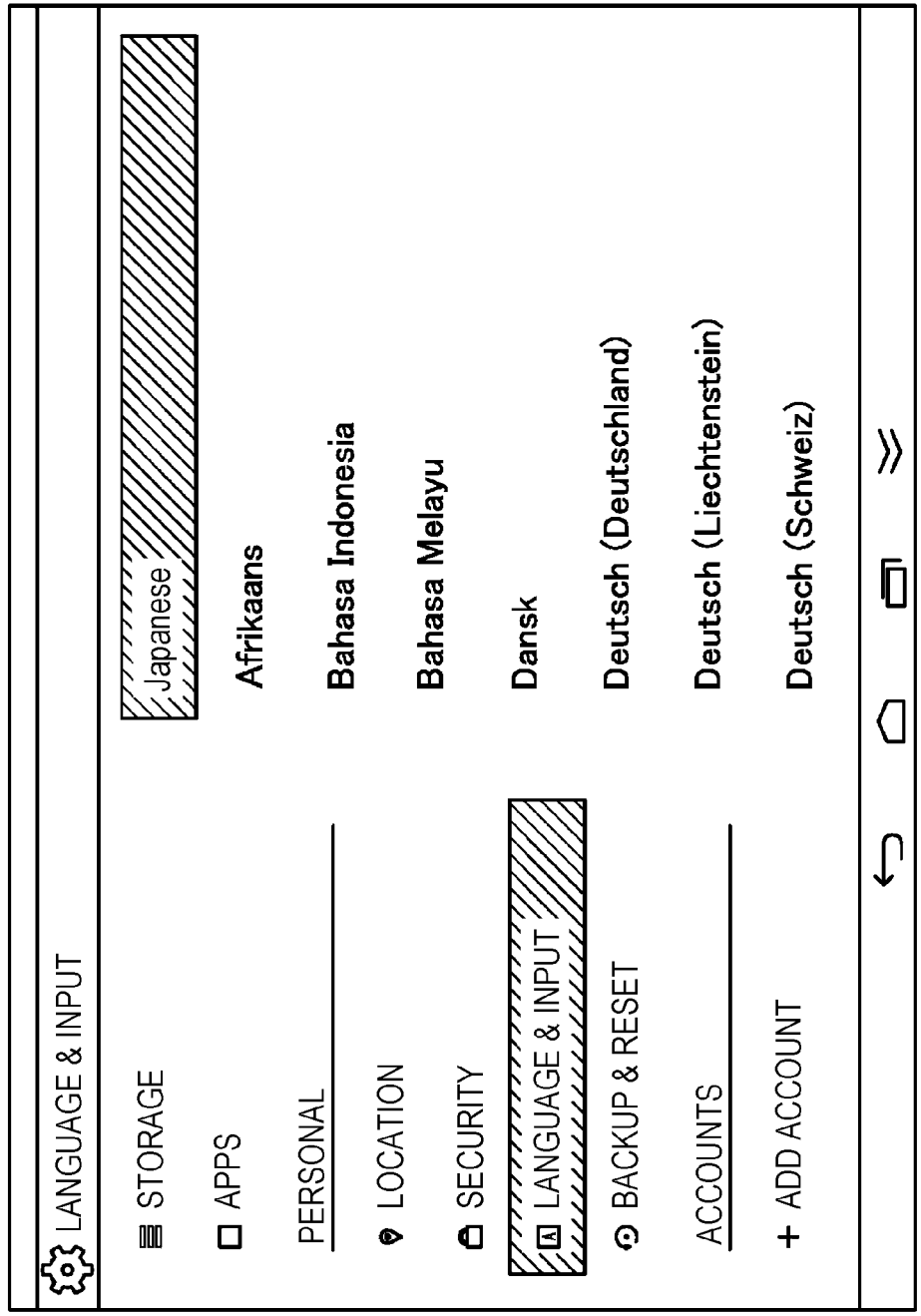
FIG. 9B is a view illustrating a third example of a setting screen for setting a display language of the first control unit.

FIG. 9A is a view illustrating a third example β3 of the setting screen for setting the display language of the second control unit 34a. FIG. 9B is a view illustrating a third example α3 of the setting screen for setting the display language of the first control unit 33a. FIG. 10A is a view illustrating a fourth example β4 of the setting screen for setting the display language of the second control unit 34*a*. FIG. 10B is a view illustrating a fourth example α4 of the setting screen for setting the display language of the first control unit 33*a*.

As illustrated in FIGS. 9A and 9B, first, the display language of the first control unit 33*a* and the display language of the second control unit 34*a* are at first set to "Japanese" and "JAPANESE" respectively.

As illustrated in FIGS. 9A and 9B, in a state shown as the third example β3 of the setting screen, a user then operates the input unit 10 to select "ENGLISH". As a result, as illustrated in the third example β3 and the fourth example β4 of the setting screen, the display language of the second control unit 34*a* is changed from "JAPANESE" to "ENGLISH".

When the display language of the second control unit 34*a* is changed from "JAPANESE" to "ENGLISH", the second determination unit 34*b* determines the display language of the first control unit 33*a* as "English (United States)" based on the second correspondence information 32*d*.

As illustrated in FIGS. 9B and 10B, when the second determination unit 34*b* determines the display language of the first control unit 33*a* as "English (United States)", the first control unit 33*a* sets "English (United States)" as the display language of the first control unit 33*a*. As a result, as illustrated in the third example α3 and the fourth example α4 of the setting screen, the display language of the first control unit 33*a* is changed from "Japanese" to "English (United States)".

Figure 11:
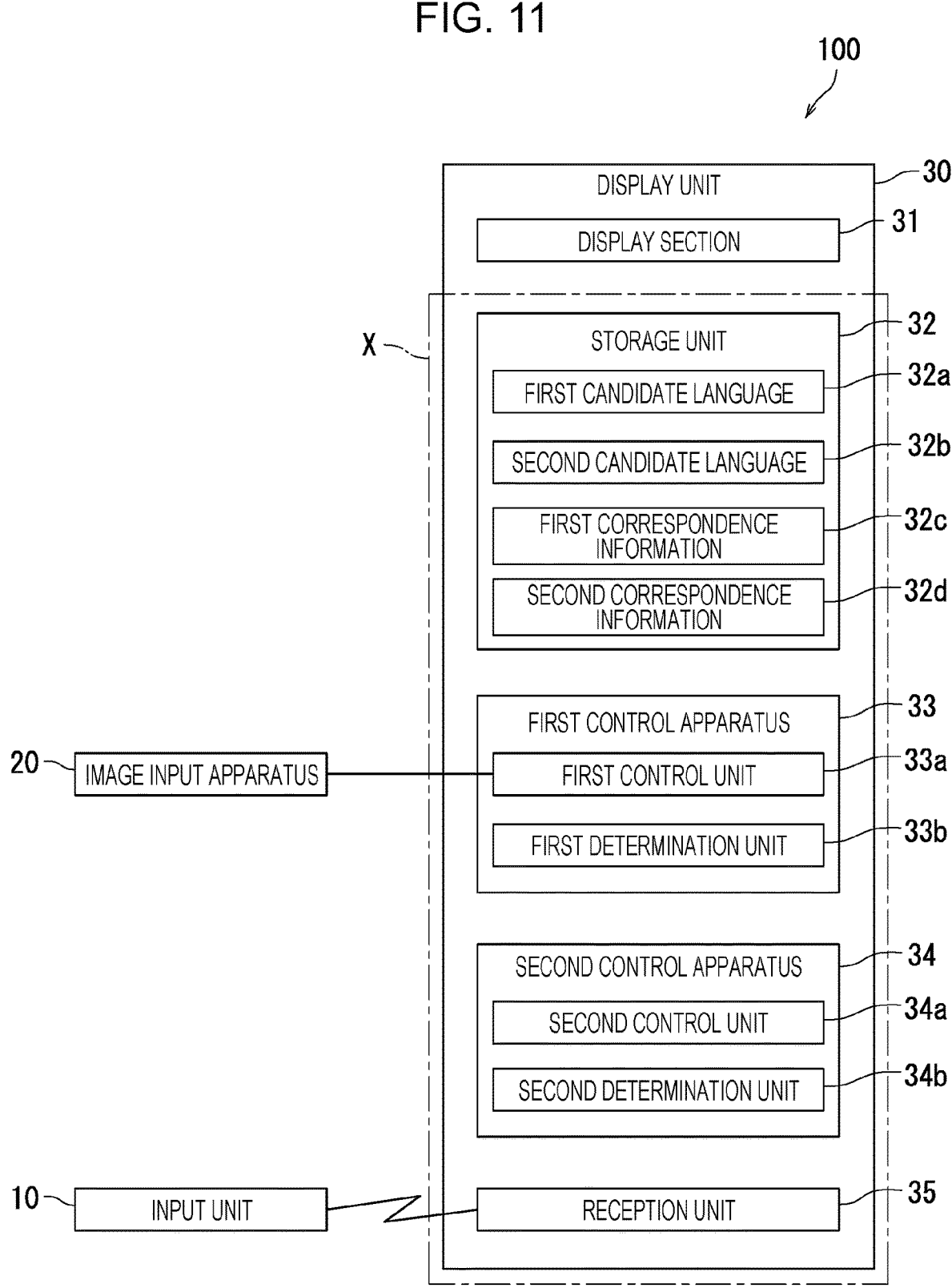
FIG. 11 is a block diagram illustrating a display apparatus according to a third embodiment of the disclosure.

Next, with reference to FIG. 11, a display apparatus 100 according to a third embodiment of the present disclosure will be described. FIG. 11 is a block diagram illustrating a display apparatus 100 according to the third embodiment of the disclosure.

The third embodiment is different from the first and second embodiments in that when a display language of a second control unit 34*a* is set, a display language of a first control unit 33*a* is determined, and when the display language of the first control unit 33*a* is set, the display language of the second control unit 34*a* is determined. Differences from the first and second embodiments will be mainly described below.

A storage unit 32 stores first correspondence information 32*c* (see FIG. 2) and second correspondence information 32*d* (see FIG. 7).

A first control apparatus 33 includes the first control unit 33*b*. The first determination unit 33*b* determines the display language of the second control unit 34*a*. A second control apparatus 34 includes a second control unit 34*b*. The second determination unit 34*b* determines the display language of the first control unit 33*a*. Note that the first determination unit 33*b* may function as the second determination unit 34*b*. Moreover, the second determination unit 34*b* may function as the first determination unit 33*b*.

When a reception unit 35 receives a selection of the display language of the first control unit 33*a* from a plurality of first candidate languages 32*a*, the display language of the first control unit 33*a* is set, and the display language of the second control unit 34*a* is set (see step S10 to step S13 in FIG. 3). As a result, it is possible to easily set a plurality of display languages.

When a reception unit 35 receives a selection of the display language of the second control unit 34*a* from a plurality of second candidate languages 32*b*, the display language of the second control unit 34*a* is set, and the display language of the first control unit 33*a* is set (see step S20 to step S23 in FIG. 8). As a result, it is possible to easily set a plurality of display languages.

Fourth Embodiment

Figure 12:
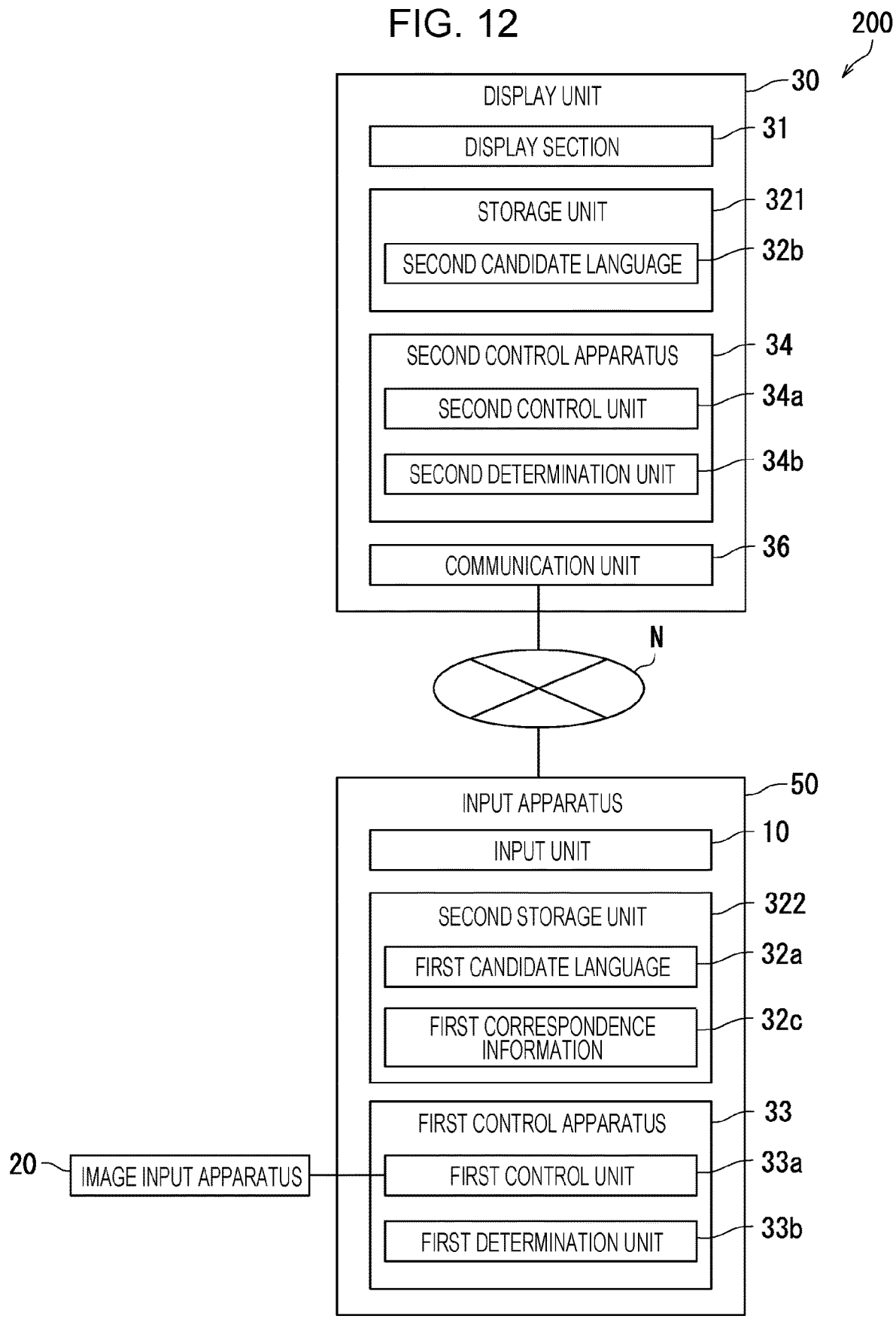
FIG. 12 is a block diagram illustrating a display system according to a fourth embodiment of the disclosure.

With reference to FIG. 12, a display system 200 according to a fourth embodiment of the present disclosure will be described. FIG. 12 is a block diagram illustrating the display system 200 according to the fourth embodiment of the disclosure.

The fourth embodiment is different from the first embodiment in that an input apparatus 50 including a first control apparatus 33 is provided. Differences from the first embodiment will be mainly described below.

As illustrated in FIG. 12, the display system 200 includes an image input apparatus 20, a display unit 30, the input apparatus 50, and a language setting apparatus X.

The display unit 30 includes a display section 31, a first storage unit 321, a second control apparatus 34, and a communication unit 36. The first storage unit 321 stores second candidate languages 32*b*. The second control apparatus 34 includes a second control unit 34*a*.

The communication unit 36 is capable of communicating with an electronic device provided with a communication device using the same communication scheme (protocol). In the fourth embodiment, the communication unit 36 communicates with the input apparatus 50 via a network N such as a local area network (LAN). The communication unit 36 is a communication module (communication apparatus) such as a LAN board.

The input apparatus 50 is, for example, a personal computer (PC), a smartphone, or a dedicated terminal device. The input apparatus 50 includes an input unit 10, a second storage unit 322, and the first control apparatus 33. The second storage unit 322 stores first candidate languages 32*a* and first correspondence information 32*c*. The first control apparatus 33 includes a first control unit 33*a* and a first determination unit 33*b*.

Note that in the display system 200, the language setting apparatus X includes the first control apparatus 33, the second control apparatus 34, the communication unit 36, the first storage unit 321, and the second storage unit 322.

In the display system 200, when a display language of the first control unit 33*a* is selected from the plurality of first candidate languages 32*a* via the input unit 10, processes similar to the processes shown in step S10 to step S13 of FIG. 3 are performed, and a display language of the second control unit 34*a* is set. Thus, it is possible to easily set the plurality of display languages.

Note that each of the display apparatus 100 of the second embodiment and the display apparatus 100 of the third embodiment may also be configured as the display system 200 by building the first control apparatus 33 in an input apparatus 50 as in the fourth embodiment.

Embodiments of the present disclosure have been described with reference to the drawings (FIGS. 1 to 12). However, the present disclosure is not limited to the embodiments. The present disclosure may be implemented in various different forms that do not deviate from the essence of the present disclosure (for example, (1) to (5)). Moreover, components disclosed in the above embodiments may be combined as appropriate in various different forms. For example, some of the components in the embodiments may be omitted. The drawings show each of the components schematically for the sake of easy understanding, but the number and the like of each component in the drawings may be different from the actual configuration. Moreover, components shown in each of the embodiments are mere examples and are not particularly limited to the embodiments. Various types of modification may be made within a scope not substantially departing from the effects of the present disclosure.

(1) In the first to third embodiments, the language setting apparatus X is mounted on the display apparatus 100. However, an apparatus on which the language setting apparatus X is mounted is not particularly limited to these embodiments. One product may include a plurality of platforms, and the language setting apparatus X may be mounted on an apparatus which enables a display language to be set for each of the platforms. The language setting apparatus X may be mounted on an audio output apparatus capable of outputting, for example, audio.

(2) In the first and third embodiments, when the processes shown in step S10 to step S13 are performed, the first control unit 33*a* or the second control unit 34*a* may cause information showing a change of the display language of the second control unit 34*a* to be displayed in the display section 31 each time the display language of the second control unit 34*a* is changed. This allows a user to recognize that the display language of the second control unit 34*a* is changed.

(3) In the second and third embodiments, when the processes shown in step S20 to step S23 are performed, the first control unit 33*a* or the second control unit 34*a* may cause information showing a change of the display language of the first control unit 33*a* to be displayed in the display section 31 each time the display language of the first control unit 33*a* is changed. This allows a user to recognize that the display language of the first control unit 33*a* is changed.

(4) In the first and third embodiments, as illustrated in the third information 43 of the first correspondence information 32*c*, when the display language of the first control unit 33*a* is changed to a minor language which is not included in the plurality of second candidate languages 32*b*, the display language of the second control unit 34*a* is changed to "ENGLISH". In this case, the first control unit 33*a* may cause information showing a change of the display language of the second control unit 34*a* to "ENGLISH" to be displayed in the display section 31. Thus, this allows a user to recognize that the display language of the second control unit 34*a* is changed to "ENGLISH". As a result, even when the display language of the first control unit 33*a* and the display language of the second control unit 34*a* are different from each other, it is possible to reduce confusion of a user.

(5) In the first to fourth embodiments, one product is provided with two control units which enable the display languages to be set. However, the present disclosure is not limited to this embodiment. One product may be provided with three or more control units which enable the display languages to be set. In this case, in correspondence information, candidate languages of one control unit correspond to respective two candidate languages of the other two or more control units. Then, when the display language of one control unit is set, the other two or more control units set their respective display languages based on the correspondence information. As a result, it is possible to easily set a plurality of display languages.

INDUSTRIAL APPLICABILITY

The present disclosure is applicable to the field of language setting apparatuses and display apparatus.

The present disclosure contains subject matter related to that disclosed in Japanese Priority Patent Application JP 2018-022213 filed in the Japan Patent Office on Feb. 9, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A language setting apparatus which enables display languages to be set, comprising:
   a first processor which sets a display language from a plurality of first candidate languages;
   a second processor unit which sets a display language from a plurality of second candidate languages;
   a reception unit which receives a selection of the display language of the first processor from the plurality of first candidate languages;
   a memory or a storage which stores first correspondence information in which each of the plurality of first candidate languages corresponds to an associated one of the plurality of second candidate languages; and
   a determination unit which determines the display language of the second processor based on the first correspondence information and a reception language representing a language which is received by the reception unit and which is included in the plurality of first candidate languages, wherein
   the determination unit includes the first processor or the second processor,
   the reception unit includes a receiver or a touch panel which receives a signal transmitted wirelessly or via a wire from a remote controller,
   the second processor sets the display language of the second processor determined by the determination unit as the display language of the processor,
   the memory or the storage stores second correspondence information in which each of the plurality of second candidate languages corresponds to an associated one of the plurality of first languages,
   the reception unit receives a selection of the display language of the second processor from the plurality of second candidate languages,
   the determination unit determines the display language of the processor unit based on the second correspondence information and a reception language representing a language which is received by the reception unit and which is included in the plurality of second candidate languages, and
   the first processor sets the display language of the first processor determined by the determination unit as the display language of the first processor.

2. The language setting apparatus according to claim 1, wherein
   the determination unit determines a second candidate language corresponding to the reception language in the first correspondence information as the display language of the second processor.

3. The language setting apparatus according to claim 1, wherein
   the plurality of first candidate languages are more than the plurality of second candidate languages.

4. The language setting apparatus according to claim 3, wherein
   the plurality of first candidate languages include a first language, the plurality of second candidate languages include a second language having a concept equivalent to a concept of the first language, and the first correspondence information includes first information in which the second languages corresponds to the first languages.

5. The language setting apparatus according to claim 3, wherein the plurality of first candidate languages include a third language, the plurality of second candidate languages include a fourth language having a concept superior to a concept of the third language, and the first correspondence information includes second information in which the fourth language corresponds to the third language.

6. The language setting apparatus according to claim 3, wherein the plurality of first candidate languages include a fifth language other than the plurality of second candidate languages, the plurality of second candidate languages include English, and the first correspondence information includes third information in which English corresponds to the fifth language.

7. A language setting method for setting display languages, the language setting method comprising:

performing first control of setting a display language from a plurality of first candidate languages;

performing second control of setting a display language from a plurality of second candidate languages;

receiving a selection of the display language from the plurality of first candidate languages by the first control;

storing first correspondence information in which each of the plurality of first candidate languages corresponds to an associated one of the plurality of second candidate languages;

determining the display language for the second control based on the first correspondence information and a reception language representing a language which is received and which is included in the plurality of first candidate languages;

setting the display language determined for the second control as the display language of the second control;

storing second correspondence information in which each of the plurality of second candidate languages corresponds to an associated one of the plurality of second first languages;

receiving a selection of the display language of the second processor from the plurality of second candidate languages;

determining the display language of the processor unit based on the second correspondence information and a reception language representing a language which is received by the reception unit and which is included in the plurality of second candidate languages; and setting the display language of the first processor determined by the determination unit as the display language of the first processor.

8. A display apparatus comprising:

a language setting apparatus which enables display languages to be set; and a display section in which an image is to be displayed, wherein the language setting apparatus includes a first processor which sets a display language from a plurality of first candidate languages, a second processor which sets a display language from a plurality of second candidate languages, a reception unit which receives a selection of the display language of the first processor from the plurality of first candidate languages, a memory or a storage which stores first correspondence information in which each of the plurality of first candidate languages corresponds to an associated one of the plurality of second candidate languages, and a determination unit which determines the display language of the second processor based on the first correspondence information and a reception language representing a language which is received by the reception unit and which is included in the plurality of first candidate languages, the determination unit includes the first processor or the second processor, the reception unit includes a receiver or a touch panel that receives a signal transmitted wirelessly or via a wire from a remote controller, the second processor sets the display language of the second processor determined by the determination unit as the display language of the second processor, the memory or the storage stores second correspondence information in which each of the plurality of second candidate languages corresponds to an associated one of the plurality of first languages, the reception unit receives a selection of the display language of the second processor from the plurality of second candidate languages, the determination unit determines the display language of the processor unit based on the second correspondence information and a reception language representing a language which is received by the reception unit and which is included in the plurality of second candidate languages, and the first processor sets the display language of the first processor determined by the determination unit as the display language of the first processor.

* * * * *